United States Patent [19]
O'Neill et al.

[11] 3,802,381
[45] Apr. 9, 1974

[54] APPARATUS FOR MEASURING CONCENTRATION RATIOS OF A MIXTURE OF MATERIALS

[75] Inventors: Roger M. O'Neill, Oak Lawn; John B. Kennedy, Jr., Chicago, both of Ill.

[73] Assignee: Continental Can Company, Inc., New York, N.Y.

[22] Filed: May 5, 1971

[21] Appl. No.: 140,573

Related U.S. Application Data
[63] Continuation of Ser. No. 748,754, July 30, 1968, abandoned.

[52] U.S. Cl............................ 118/7, 118/9, 118/637
[51] Int. Cl............................................. B05c 11/00
[58] Field of Search............... 118/7, 9, 637; 324/34, 324/61

[56] References Cited
UNITED STATES PATENTS

| | | | |
|---|---|---|---|
| 3,527,651 | 9/1970 | Shelffo et al. | 118/7 X |
| 2,958,037 | 10/1960 | Riede et al. | 324/41 |
| 3,233,173 | 2/1966 | Lees et al. | 324/61 |
| 3,475,316 | 10/1969 | DeVittorio | 204/299 |
| 2,671,200 | 3/1954 | Lederer | 324/71 |
| 3,233,781 | 2/1966 | Grubbs | 222/57 |
| 3,399,652 | 9/1968 | Gawron | 118/637 |

Primary Examiner—Mervin Stein
Assistant Examiner—Leo Millstein
Attorney, Agent, or Firm—Diller, Brown, Ramik & Wight

[57] ABSTRACT

An apparatus for measuring the ratio of carrier particles to toner particles in an electrostatic printing operation is disclosed herein. The apparatus includes the employment of the electrical properties dependent upon the ratio of carrier to toner particles in a carrier-toner mix to determine the suitability of that ration for an electrostatic printing operation. Variations in magnetic permeability, dielectric permittivity, electrical conductivity or combinations of these three parameters are employed to indicate variations in the ratio of carrier to toner. An electric or magnetic field is established in the area of a quantity of mix and a measurement of one or more of the aforementioned parameters is employed to indicate the need for a greater or lesser percentage of toner or carrier in the mix.

Apparatus for indicating the carrier-toner ratio includes provisions for establishing an electric or magnetic field in a quantity of mix and provisions for providing an output signal representative of one or more of the aforementioned parameters exhibited by the quantity of mix. A trough located in the path of movement of mix within an electrostatic printing device provides a build-up of mix in which the aforementioned fields may be established.

5 Claims, 9 Drawing Figures

PATENTED APR 9 1974
3,802,381
SHEET 1 OF 3
FIG.1
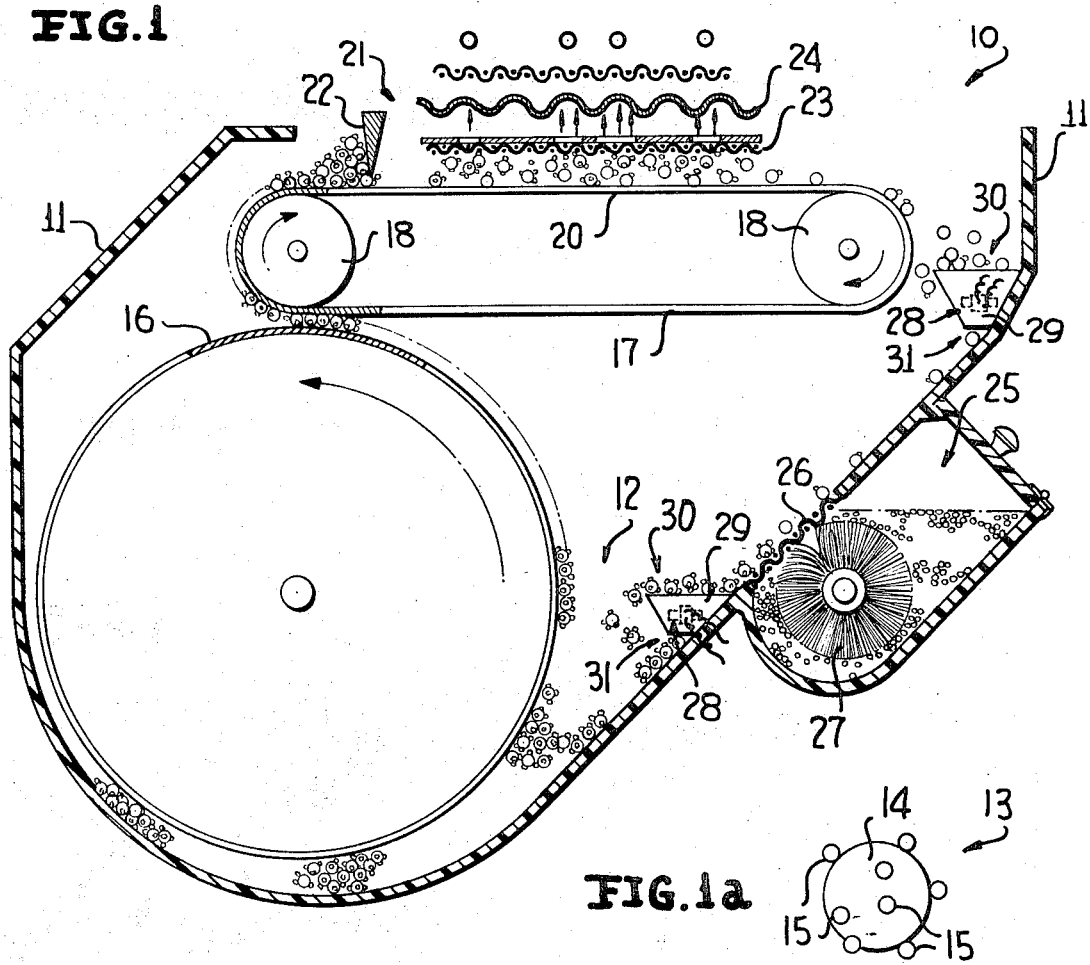
FIG.1a
FIG.2
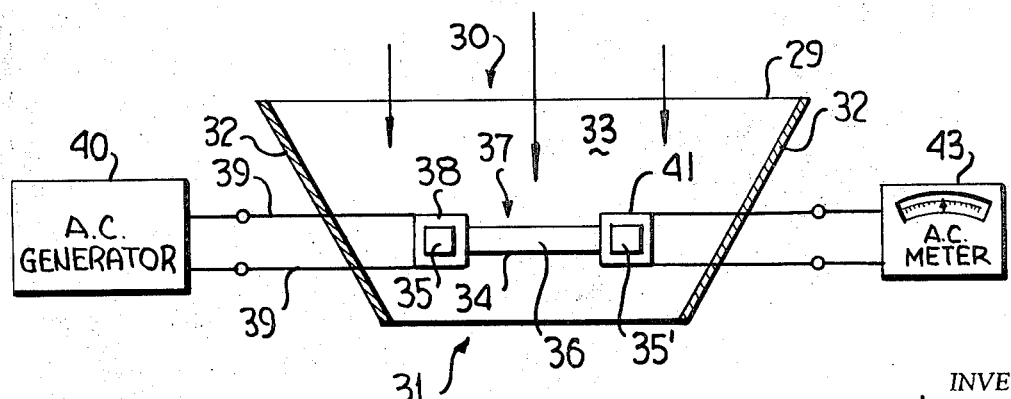
INVENTORS
ROGER M. O'NEILL
JOHN B. KENNEDY, Jr.
BY
Mason, Porter, Weller & Brown
ATTORNEYS INVENTORS
ROGER M. O'NEILL
JOHN B. KENNEDY, Jr.

BY Mason, Porter, Weller & Brown
ATTORNEYS

INVENTORS
ROGER M. O'NEILL
JOHN B. KENNEDY, Jr.

APPARATUS FOR MEASURING CONCENTRATION RATIOS OF A MIXTURE OF MATERIALS

This application is a continuation of application Ser. No. 748,754, filed July 30, 1968 and now abandoned.

This invention relates generally to apparatus for determining the ratio of metallic carrier particles to non-metallic toner particles in a mix of such particles employed in an electrostatic printing or coating operation or the like, and more particularly to methods and apparatus for establishing a field in an area occupied by a mix of metallic carrier particles and non-metallic toner particles and for employing the field so established to indicate the concentration ratios of the differing particles.

In the past, attempts have been made to measure the concentration ratios of powder mixtures within electrostatic printing devices of the type employing carrier particles and toner particles. Such measurement is valuable in maintaining optimum qualities in the final printed product inasmuch as the electrostatic printing process, by its nature, removes toner particles from the initial mix comprising a predetermined ratio of metallic carrier particles to non-metallic toner particles. Thus, in order to produce printed articles of suitable clarity over an extended period of time it is necessary to replace the toner particles to maintain the most desirable ratio of carrier to toner particles.

In previous attempts to maintain predetermined carrier-toner ratios within developer mixes, optical surveillance of the mix has been employed. In such attempts, the differences in coloration between the toner particles and the carrier particles have been utilized such that the relative degree of "darkness" or "lightness" of the powder mixture indicates variations from the optimum carrier-toner ratio. In employing the optical characteristics of the carrier and toner particles the surface of a quantity of mix is monitored. The optical monitoring technique has proven successful in some applications. However, if the optical surveillance of the mix is sufficiently sensitive to indicate slight alterations in the carrier-toner ratio, sensitivity to variations in the optical qualities of the component powders of the mix may result in an incorrect indication of the carrier-toner ratio. Furthermore, optical surveillance is ineffective when the optical qualities of both carrier particles and toner particles are similar.

Employment of the electrical properties of a carrier-toner mix to determine the suitability of the carrier-toner ratio for employment in an electrostatic printing operation removes the inherent deficiencies encountered in optical surveillance. All materials, whether characterized as conductive, dielectric or of an intermediate nature, can electrically be described by three fundamental properties, these properties being magnetic permeability, dielectric permittivity, and electrical conductivity. The electrical characteristics of a mix of two separate materials is dependent upon the characteristics of the constituent materials and the ratio of one constituent material to another. Thus, a measurement of one or more of the aforementioned parameters exhibited by a mix of carrier and toner particles in an electrostatic printing operation provides an indication of the ratio of carrier-toner particles in that mix.

For the purposes of this application, permeability may be defined as the ability of a particular material to store magnetic energy, permittivity may be defined as the ability of the material to store electrical energy and conductivity may be defined as a measure of all energy loss mechanisms in the material. By this definition conductivity is really an equivalent conductivity dependent upon a summation of the normal Joulean energy losses ($I^2R$) plus the dielectric energy loss and magnetic energy loss. Dielectric and magnetic energy losses, being functions of frequency, reduce to zero for D.C. measurements and the equivalent D.C. conductivity is exactly an inverse function of the Joulean energy losses ($I^2R$).

An electrostatic printing operation employing conductive carrier particles and non-conductive toner particles, by its very nature, effects a continuing alteration in the carrier-toner mix of each of the aforementioned characteristics through the continuing release of toner particles in the printing operation. A monitoring of permeability, permittivity, or any one of the three characteristics contributing to equivalent conductivity or a monitoring of combinations of these parameters and/or sub-characteristics provides a continuing indication of the quality of mix in an electrostatic printing process.

Similarly, should carrier particles and toner particles be employed which are both metallic but of differing electrical properties, the monitoring of the electrical properties of the carrier-toner mix as a whole may be employed to indicate the ratio of the particles of differing electrical properties. For example, where two metals of differing permeability are employed, the overall permeability will be dependent upon the aforesaid ratio to indicate the quality of the all-metallic mix.

In accordance with the foregoing, it is a primary object of this invention to provide an apparatus for determining the ratio of carrier particles to toner particles in a mixture of such particles through a utilization of the difference in the electrical properties of the two component particles.

It is an additional object of this invention to provide an apparatus for detecting the ratio of carrier particles to toner particles in an electrostatic toner depositing, printing or coating process through the establishment of a field in an area occupied by a quantity of carrier-toner mix and by monitoring variations in the field resultant from the presence of metallic particles therein.

A still further object of this invention is to provide apparatus for determining the ratio of metallic carrier particles to non-metallic toner particles in an electrostatic printing device including a coil for establishing a magnetic field within the device in an area occupied by a quantity of carrier-toner mix and apparatus responsive to permeability in the area occupied by the mix for detecting and indicating the ratio of carrier particles to toner particles.

Yet another object of this invention is to provide apparatus for determining the carrier-toner ratio within an electrostatic printing device including a pair of electrically separated electrodes for establishing an electric field in an area occupied by a quantity of carrier toner mix and provisions for indicating variations in concentration ratios within the mix in response to variations in equivalent conductivity and permittivity between the spaced electrodes.

A further object of this invention is to provide an apparatus for determining the carrier-toner ratio within an electrostatic printing device by a measurement of the D.C. conductivity of the carrier-toner mix.

It is still another object of this invention to provide in cooperation with apparatus of any of the aforegoing types, a conduit lying in the path of movement of the carrier-toner mix within the electrostatic printing device for providing a build-up of mix in the area in which the carrier-toner ratio measurement is to be effected.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a diagrammatic view of electrostatic printing apparatus, and shows the inclusion of provisions for measuring the ratio of metallic carrier particles to non-metallic toner particles located within the path of movement of the developer mix within the printing apparatus.

FIG. 1a is a diagrammatical illustration of a developer particle of the type used in electrostatic printing and shows a plurality of smaller toner particles adhering to a larger carrier particle.

FIG. 2 is a diagrammatical illustration of carrier-toner ratio measuring apparatus, and shows apparatus for establishing a magnetic field within a mix accommodating trough.

Figure 3:
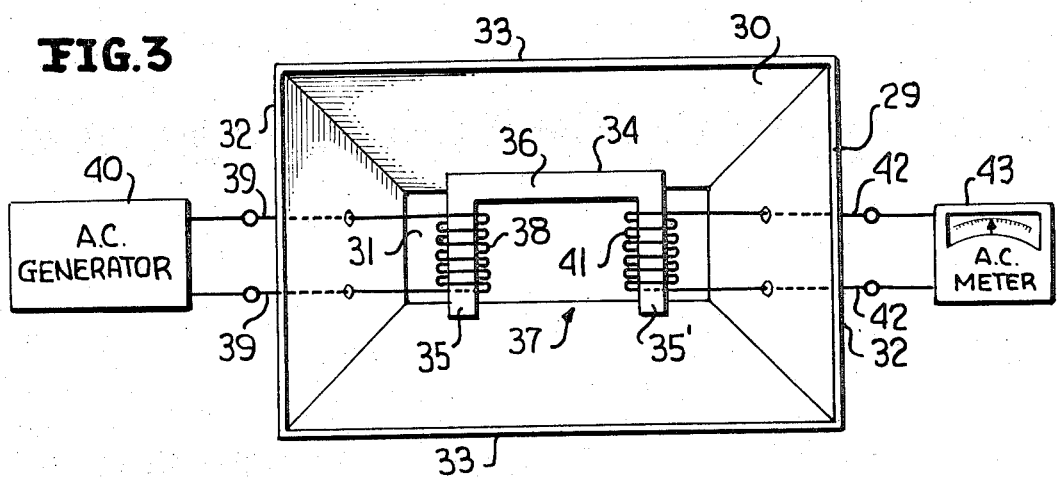
FIG. 3 is a diagrammatical top plan view of the embodiment shown in FIG. 2, and more clearly shows the provision of a magnetic field establishing coil and a field sensing coil, both wound upon a magnetic core within the trough.

Referring to the drawings in detail, FIG. 1 illustrates an electrostatic printing device, generally referred to by the numeral 10, of a type suitable for use in the practice of this invention and generally of the type shown and described in the U.S. Pat. to K. W. Rarey and J. B. Kennedy, Jr., No. 3,306,193. The electrostatic printing device or printing machine 10 includes a suitable non-metallic housing 11 shaped to define a developer mix depository 12. The mix depository 12 is positioned to receive a quantity of developer mix of the type including numerous developer particles such as the developer particle 13 best seen in FIG. 1a.

The developer particle 13 includes a metallic carrier particle 14 and numerous non-metallic toner particles 15 in adhering relation to the surface of the carrier particles 14. The metallic carrier particles 14, of course, serve to transport the non-metallic toner particles 15 into the printing zone of an electrostatic printing device and it is the non-metallic toner particles which are ultimately employed in producing a printed image.

Disposed adjacent the depository 12 of the printing machine 10 is a rotatable magnetic feeding drum 16 which, upon rotation, transports a quantity of the developer mix upwardly into adhering relation with an elongate conductive belt electrode 17. The conductive belt 17 is entrained for movement about two belt support pulleys 18. The upper run 20 of the endless conductive belt 17 conveys a predetermined quantity of mix into the printing zone 21 of the over-all printing machine 10. A doctor blade 22 may be arranged in proximity to the upper run 20 of the belt 17 to maintain a relatively constant feed of developer into the printing zone 21. The establishment of an appropriate field or fields in the printing zone 21 draws the developer particles 13 upwardly into contact with a screen stencil 23 and a portion of the non-metallic toner particles 15 are removed from the metallic carrier particles 14 for the production of an image upon a substrate 24 as determined by the configuration of the masking of the screen stencil 23. It will, of course, be evident that the ratio of metallic carrier particles to non-metallic toner particles is altered within the printing area 21 and the developer mix is conveyed via the conductive belt electrode 17 away from the printing area 21 for return to the depository 12.

The quantity of toner particles in the developer mix is replenished during movement of the developer mix from the printing area to the depository 12. A toner reservoir 25 provides a source for the replenishing of toner in the developer mix. A screened window 26 communicates between the interior of the housing 11 and the reservoir 25 and a rotatable brush 27 effects passage of toner particles through the screened window 26 and developer particles en route from the printing zone 21 to the depository 12 pass across the screened window 26. The screen mesh of the window 26 is sufficiently fine to prevent the passage of carrier particles therethrough while permitting rotation of the brush 27 to effect replenishment of the toner in the developer mix recently employed in the printing operation.

A pair of carrier toner ratio measuring devices are generally referred to by the numeral 28. The ratio measuring devices 28 are positioned to provide a build-up of developer mix therein during passage of the mix from the printing zone 21 to the depository 12 in a fashion to be more fully described hereinafter. As shown in FIG. 1, a ratio measuring device may be included in the printing machine 10 intermediate the printing zone 21 and the toner source or reservoir 25 for detecting the ratio of metallic carrier particles to non-metallic toner particles in the developer mix just subsequent to a printing operation. In such case, the indication of carrier-toner ratio provided by the ratio measuring device 28 is indicative of the amount of toner required to bring the recently employed developer mix to a predetermined optimum concentration ratio.

Further, the ratio measuring device 28 may be positioned in the path of flow of the developer mix subsequent to the addition of toner via the brush 27 and screened window 26 to indicate the concentration ratio of the mix just prior to the accumulation thereof in the depository 12. In this case the indication provided by the ratio measuring device 28 is indicative of the concentration ratio of the mix employed in the printing process and, again, variations from the optimum carrier-toner ratio may be employed to control the replenishing of toner via the rotatable brush 27 and the screened window 26.

The carrier-toner ratio measuring device 28 may include a trough 29 in the form of a conduit having an enlarged open end 30 and a smaller open end 31. As shown, the trough 29 comprises a pair of generally converging end plates 32 and converging side plates 33 extending therebetween. Preferably, the enlarged open end 30 of the trough 29 lies in the path of movement of the developer mix at a point where such mix is relatively freely moving along a predetermined path. The enlarged open end 30 into which the mix flows should encompass less than the total cross sectional area of the flow path at the point where the trough is located. Thus, the enlarged open end 30 of the trough 29 should be of lesser cross sectional area than the cross sectional area of the flow path such that only a portion of the developer mix flowing past the trough 29 is directed into the trough through the enlarged open end. Egress from the trough 29 is through the smaller open end 31 and the flow of mix out of the opening 31 is restricted such that a build-up of mix takes place within the trough 29 as best seen in FIG. 1. Accordingly, the trough 29 serves to maintain a predetermined quantity of mix therein during the normal operation of the printing machine 10. Additionally, once the trough 29 has been filled completely, additional developer particles moving in a path intersected by the enlarged open end 30 of the trough 29 spill over the edges of the trough and continue to flow in a predetermined path within the printing apparatus. Thus, while flow through the trough 29 is restricted, no restriction is effected in the over-all flow of developer mix in the path wherein the trough 29 is located.

Utilization of the trough 29, then, provides a predetermined quantity of developer mix in which the ratio of metallic carrier particles to non-metallic toner particles may be measured. The establishment of electrical or magnetic fields within the trough 29 in the area occupied by the build-up of mix is effected through the utilization of any of the embodiments shown in FIGS. 2-7. In FIGS. 2 and 3, there is shown a magnetic core 34 disposed within the trough 29. The core 34 is generally U-shaped having a pair of arms 35, 35' interconnected by a bight portion 36. The separation of the arms 35, 35' provides an air gap 37 through which the quantity of developer mix to be sampled passes. The core 34 may be of any of a number of known magnetic materials and one of the arms 35 mounts an electromagnetic coil 38 which is wound thereon and which has the ends 39, 39 thereof brought off for connection to a suitable AC generator 40. Energization of the coil 38 by the generator 40 establishes a magnetic field across the air gap 37.

The remaining arm 35' of the core 34 mounts a second electromagnetic coil 41 which is wound thereon and has the ends 42, 42 thereof brought off for connection to a suitably selected AC meter 43 capable of detecting and indicating a signal produced across the coil 41. The coil 41 serves as a sensing coil coupled to the field establishing coil 38 via the magnetic core 34 and the quantity of mix present in the air gap 37. Variations in the coupling of the sensing coil 41 with the field establishing coil 38 result in variations in the signal produced across the coil 41 and such variations will, of course, be indicated by the AC meter 43. The reluctance of the magnetic path including the core 34 and the air gap 37 is dependent upon the permeability of the developer mix accommodated within the air gap 36 and variations in such permeability will, of course, result in variations in indications by the meter 43.

When the carrier particles which constitute a portion of the developer mix are of a magnetic nature, as for example, ferromagnetic nickel, the ratio of magnetic material (carrier particles) to non-metallic material (toner particles) within the air gap 37 will, of course, directly effect the permeability in the area of the established magnetic field and the AC meter 43 may be calibrated to indicate the proportion of magnetic carrier particles within the developer mix. That is, an increase in the amount of non-metallic powder to magnetic powder within the homogeneous mixture of both such powders effects a decrease in the permeability of the mix and an increase in reluctance such that the coupling between the field establishing coil 38 and the field sensing coil 41 is decreased with a resultant decrease in the signal produced across the coil 41 as detected by the meter 43.

Similarly, the ratio of non-magnetic, metallic particles to non-metallic particles may be determined inasmuch as the production of a field through such a mix results in the establishment of eddy current within or upon the metallic carrier particles and an increase in the ratio of metallic powder to non-metallic powder within the mix results in an increase in losses such that the signal produced across the sensing coil 41 is decreased and, again, the meter 43 may be calibrated to indicate the ratio of carrier particles to toner particles. Thus, variations in the concentration ratio in the developer mix within the air gap 37 result in variations in the equivalent conductivity in the mix with resultant variations in losses in the mix containing area. The reluctance exhibited by the magnetic path including the core 34 and the air gap 37 will reflect such variations in losses to vary the degree of coupling between the coils 38 and 41.

Where both the toner and carrier particles are metallic but of differing electrical properties, reluctance variations may again be indicated by the meter 43 inasmuch as the reluctance exhibited by the mix within the air gap 37 will vary in dependence upon variations in the ratio of carrier and toner particles. Attention to the frequency of the signal applied to the coil 38 will result in improved sensitivity in the indication provided by the meter 43.

Figure 4:
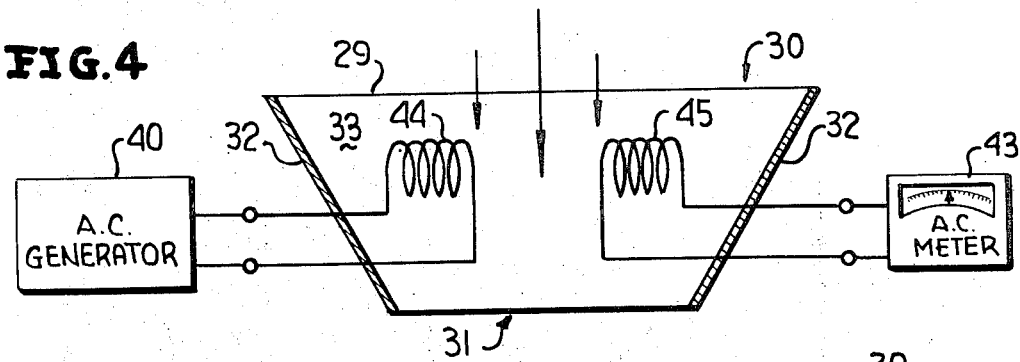
FIG. 4 is a diagrammatical illustration of a further embodiment of the carrier-toner ratio measuring apparatus, and shows a magnetic field establishing coil and a field sensing coil coupled to the field establishing coil in the absence of the magnetic core shown in FIGS. 2 and 3.

It should be noted that while the employment of a core 34 as shown in FIGS. 2 and 3 aids in the establishment of the magnetic field within the trough 29, suitable positioning of a field establishing coil 44 and a sensing coil 45 in the absence of a magnetic core as shown in FIG. 4 may be employed to provide an indication of the concentration ratio of the mix within the trough 29 and in this embodiment, coupling of the two coils 44 and 45 is effected only through the quantity of mix located between such coils. Similarly, the utilization of a single field establishing coil with the trough 29 may, in some instances, be sufficient to provide an indication of the concentration ratios within the trough 29 inasmuch as the inductance of such a coil will vary in response to variations in reluctance in the surrounding area.

Figure 5:
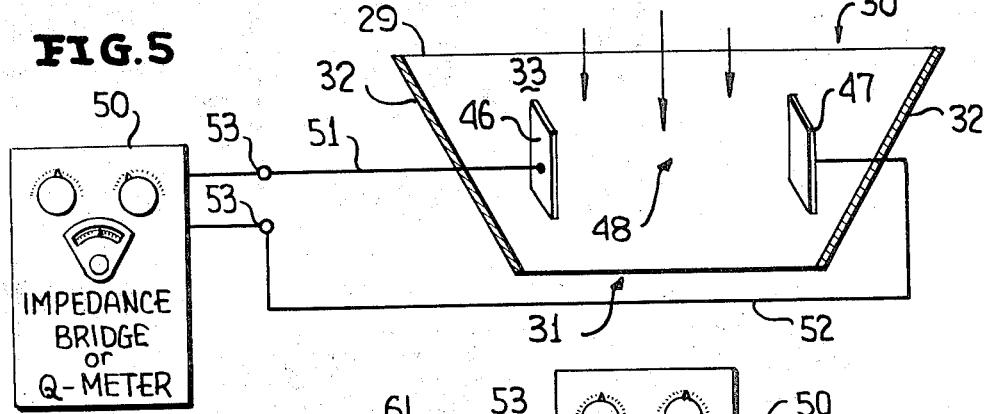
FIG. 5 is a diagrammatical illustration of a further embodiment of apparatus for measuring the metallic carrier particle to non-metallic toner particle ratio, and shows a pair of electrically separated electrodes for establishing an electric field in the mix-accommodating trough.

Turning to FIG. 5, a further embodiment of the carrier-toner ratio measuring device is shown employing a pair of spaced electrodes 46 and 47 disposed within the trough 29. The electrodes 46 and 47 constitute a parallel plate capacitor and these electrodes are electrically separated by an area 48 through which passes the quantity of developer mix to be sampled. A suitably selected electrode energizing and detector device 50 is connected to the electrodes 46 and 47 via a pair of leads 51 and 52 for establishing an electrical field between the two electrodes within the trough 29. Impedance bridges and Q-meters suitable for employment as the energizing and detecting device 50 are widely commercially available from a number of sources and provide an AC source connected to present a relatively high frequency energizing signal at a pair of terminals 53. The utilization of such a commercially available impedance bridge or commercially available Q-meter provides an indication of the electrical characteristics of the external circuit applied to the terminals 53 and, thus provides a means for detecting variations in the impedance across such terminals. A separate source and detector could, of course, be employed in lieu of an impedance bridge or Q-meter.

In the embodiment shown in FIG. 5, the impedance of the circuit including the lead 51, the plate 46, the quantity of developer mix within the area 48, the plate 47, and the lead 52 will be dependent upon the characteristics of the electric field established between the electrodes 46 and 47 as energized at a relatively high frequency from the detector 50. The characteristics of the electric field established between the electrodes 46 and 47 will depend upon the dielectric permittivity and equivalent conductivity through the area 48 lying between such electrodes and increases in the ratio of metallic carrier particles to non-metallic toner particles within this area will result in an increased equivalent conductivity and a resultant reduction in electrical capacitance between the two spaced electrode plates 46 and 47. The resultant change in permittivity and equivalent conductivity with the corresponding change in electrical capacitance may be detected and evaluated through the utilization of the commercially available impedance bridge or commercially available Q-meter and the frequencies available through the use of such devices are, as a rule, sufficiently high to provide adequate sensitivity in the instant application. Thus, detection and evaluation through the utilization of the energizing and detecting device 50 provides an indication of the concentration ratio of the mix within the area 48.

Figure 6:
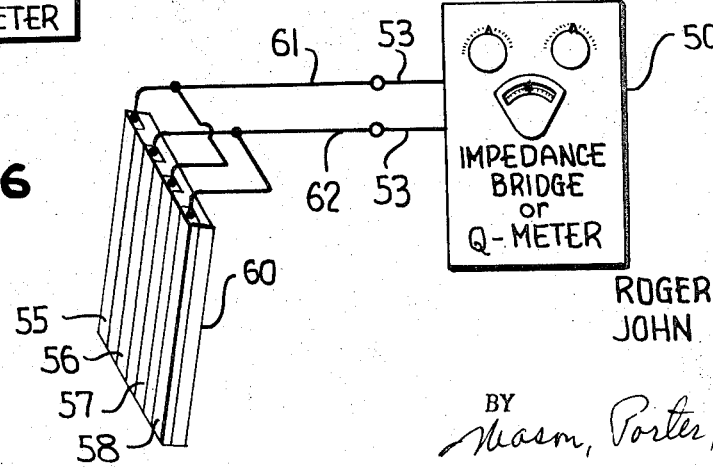
FIG. 6 is a diagrammatical illustration of a further embodiment of the ratio detecting apparatus of FIG. 5, and shows an arrangement of electrically separated strip-like electrodes mounted upon an insulating support for the establishment of an electric field through a quantity of developer mix.

FIG. 6 shows a further embodiment of the ratio measuring arrangement of FIG. 5 wherein a plurality of strip-like electrodes 55 through 58 are mounted upon and electrically separated by an insulating mounting block 60. The block 60 may be mounted within a flow-restricting trough or placed in the path of movement of the developer mix within the printing machine such that the mix flows over the surface of the block 60.

The strip electrodes 55 through 58 are alternatively energized from the terminals 53 of the monitoring device 50 via a pair of leads 61 and 62. The strip electrodes 55 and 57 are commonly energized as are the strip electrodes 56 and 58. Energization of the strip electrodes 55 thorugh 58 results in the establishment of an electric field in the area of the surface of the insulating block 60 over which flows the developer mix. Again, a commercially available Q-meter or a commercially available impedance bridge may be employed to indicate the ratio of metallic carrier particles to non-metallic toner particles within the mix as set forth hereinabove with respect to FIG. 5.

Figure 7:
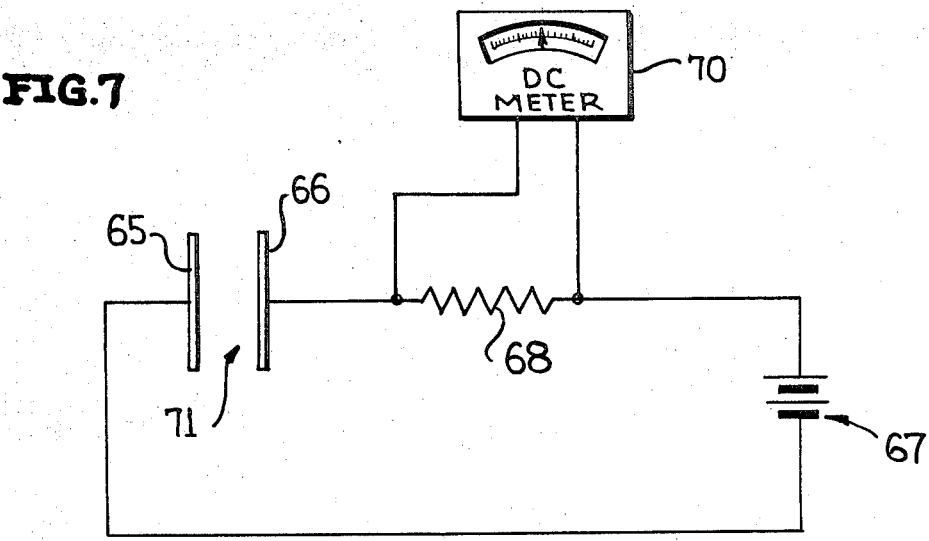
FIG. 7 is a diagrammatical illustration of a further embodiment of apparatus for measuring the metallic carrier particle to non-metallic toner particle ratio, and shows a pair of electrically separated electrodes in combination with a D.C. source and meter provisions responsive to variations in D.C. conductivity intermediate the electrodes.

FIG. 7 shows a further embodiment of the carrier-toner ratio measuring arrangement including a pair of spaced electrodes 65, 66 connected in series with a DC source 67 and a resistor 68. A DC meter 70 connected across the resistor 68 is suitably chosen to indicate the voltage drop across the resistor 68. As in the previous arrangements, a quantity of mix is directed into the space 71 intermediate the electrodes 65 and 66.

The carrier-toner ratio of developer mix in the areas 71 intermediate the electrodes 65 and 66 again determines the impedance characteristics across the electrodes 65 and 66 as discussed hereinabove with respect to the embodiments of FIGS. 5 and 6. Inasmuch as the DC source 67 and DC meter 70 are employed in the arrangement of FIG. 7, the voltage drop across the resistor 68 will be indicative of that portion of the impedance of the mix constituting the D.C. resistance thereof. Accordingly, the D.C. conductivity intermediate the electrodes 65 and 66 increases with increases in the ratio of metallic carrier to non-metallic toner, causing an increase in the voltage drop across the resistor 68 and an indication of the variation in carrier-toner ratio by the suitably selected D.C. voltmeter 70.

It is noteworthy that existing electrostatic printing device elements could be employed as the electrodes 65 and 66 of FIG. 7 to effect measurement of the carrier-toner ratio with little modification of the existant printing apparatus. For example, the doctor blade 22 and the conductive belt 17, illustrated in FIG. 1, could be employed as the electrodes 65 and 68 in FIG. 7, in which case, D.C. conductivity would be monitored in the pile-up of developer mix against the doctor blade 22 and contacting the conductive belt 17.

Inasmuch as each of the carrier-toner ratio detecting provisions of FIGS. 2–7 provide a signal dependent upon the relative quantities of carrier and toner in the developer mix, replenishing of toner may be directly controlled by the carrier-toner ratio representative signal.

Figure 8:
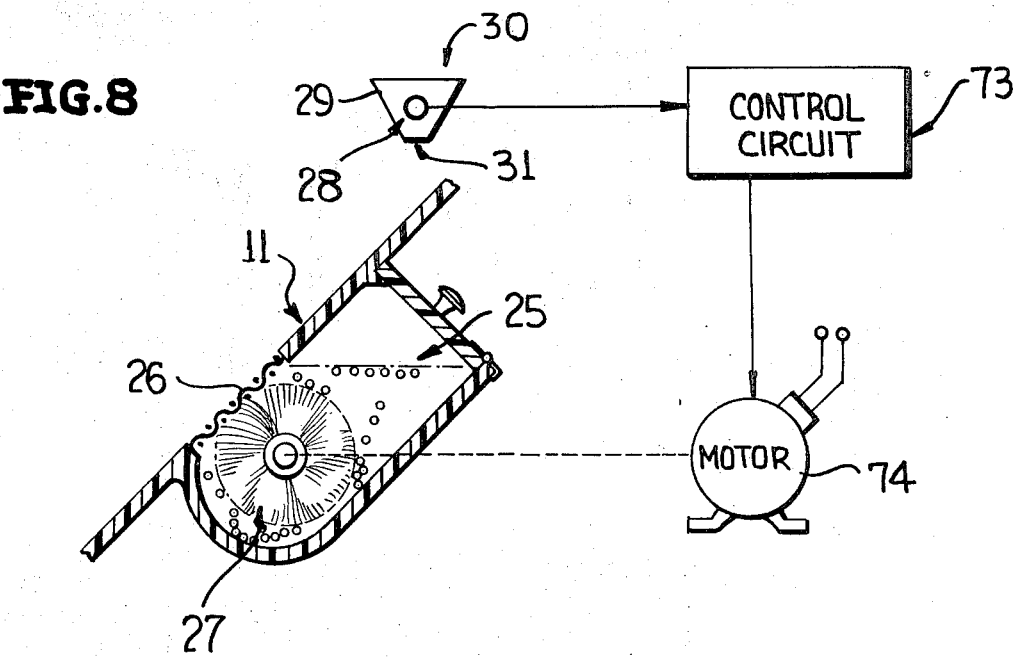
FIG. 8 is a general diagrammatical illustration of a mixture control arrangement suitable for employment with electrostatic printing apparatus as illustrated in FIG. 1 and employing any of the ratio detecting apparatus illustrated in FIGS. 2–7.

FIG. 8 generally illustrates the employment of the ratio representative signal provided by any of the detecting provisions of FIGS. 2–7 to control the toner replenishing provisions of an electrostatic printing device of the type illustrated in FIG. 1. A detector or ratio measuring device 28 is shown in combination with a trough 29 which may be located conveniently within the printing device as discussed hereinabove and such that developer mix enters the enlarged open end 30 and exits through the smaller open end 31, passing the detector 28 en route. Replenishment of toner is effected through the imparting of rotary movement to the brush 27 by a suitably selected motor 74 such that toner is added to the developer mix through the screened window 26 communicating between the interior of the housing 11 and the toner reservoir 25. A suitably selected control circuit 73 employs the carrier-toner ratio representative signal provided by the detector 28 to control energization of the motor 74 upon an increase in the carrier-toner ratio beyond a predetermined acceptable limit. The control circuit 73 may be any of a number of suitable control provisions employable for motor control in response to variations of a control signal beyond a predetermined limit. For example, the control circuit 73 may include a signal source for providing a standard signal and a comparison circuit in association with the signal source for comparing the output of the detector 28 with the standard signal to control energization of the motor 74 upon a predetermined variation of the detector output from the standard signal. Accordingly, the need for constant personal surveillance of the carrier-toner ratio indication is obviated inasmuch as such surveillance is provided automatically and replenishment of toner is effected when necessary.

It will be noted that each of the embodiments shown in FIGS. 2–7 may be included in a suitable probe which may be inserted through an opening in the side of the trough 29 or, provided a developer mix flow of relatively constant volume is available, the embodiments of FIGS. 2–7 may be employed in the area of such a flow absent the provision of a flow restricting trough. Further, the embodiments shown in FIGS. 2–7 may be employed in an area containing a relatively static quantity of developer mix sufficient to allow detection of the concentration ratio thereof.

It will further be noted that each of the embodiments in FIGS. 2–8 is employable in a variety of printing devices wherein toner is expelled to an adjacent substrate to provide a covering material thereon which may take the form of a predetermined design, a number of characters forming a printed message or code or a substrate coating.

While preferred forms and arrangements have been shown in illustrating the invention, it will be readily understood that variations may be made in the embodiments disclosed herein without departure from the spirit and scope of the invention as defined in the appended claims.

We claim:

1. An electrostatic printing or coating device employing a developer mix of dry carrier particles having first electrical properties and smaller dry toner particles having second electrical properties differing from said first electrical properties, said toner particles adhering to said carrier particles by triboelectric forces, comprising means for transporting a portion of said mix from a depository into the application area; means for applying toner particles from said mix in said application area to a substrate; means for moving mix, including unused toner particles, from said application area along a return path toward said depository; means disposed along said return path for facilitating the addition of toner particles to said mix to compensate for the toner particles applied to said substrate; a collection trough disposed in the path of said mix moving along said return path, said collection trough being spaced from said application area and comprising means for accommodating a generally constant volume of said mix while said mix moves along said return path, means for establishing a field within said volume of said mix within said trough; means responsive to variations in said field resultant from variations in at least one of the properties of dielectric permittivity, electrical conductivity and magnetic permeability caused by changes in the ratio of carrier and smaller toner particles which adhere thereto to indicate the reduction of toner particles in said mix through application thereof to said substrate and to indicate the need for additional toner to said mix.

2. An electrostatic printing or coating device according to claim 1 including means responsive to an output from said means responsive to variations in said field for controlling said means for facilitating the addition of toner particles to said mix prior to introducing said mix into the printing or coating zone.

3. An electrostatic printing or coating device according to claim 1 wherein said means for establishing a field is a magnetic means for establishing a magnetic field.

4. An electrostatic printing or coating device according to claim 1 wherein said means for establishing a field is a means for establishing an electrical field, and said means responsive to variations in said field are responsive to variations in dielectric permittivity.

5. An electrostatic printing or coating device according to claim 1 wherein said means for establishing a field is a means for establishing an electrical field including a current path, and said means responsive to variations in said field are responsive to variations in electrical conductivity.

* * * * *